June 5, 1923.
C. H. LIPPY
1,457,929
GLARE SHIELD
Filed Jan. 25, 1922
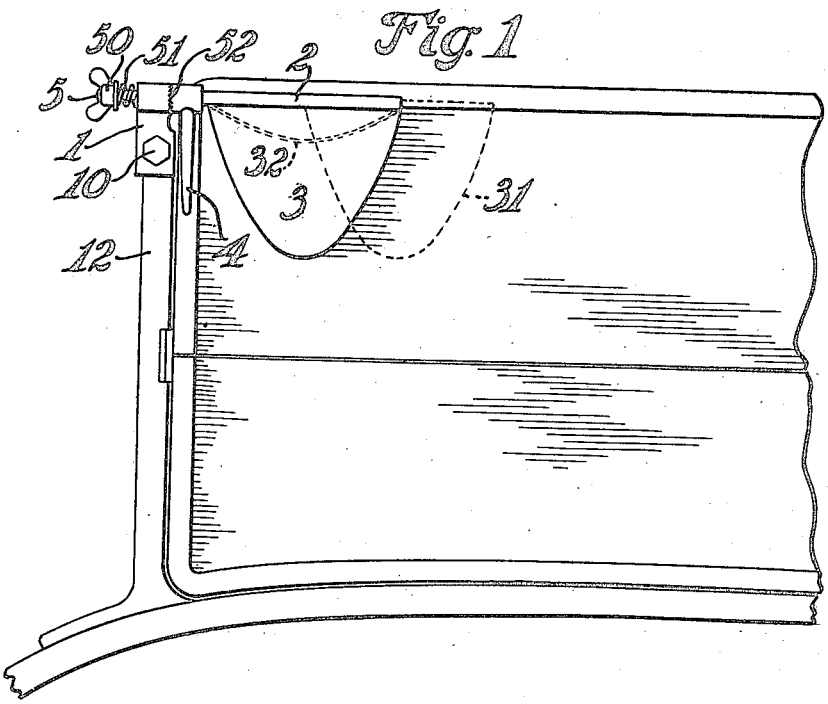
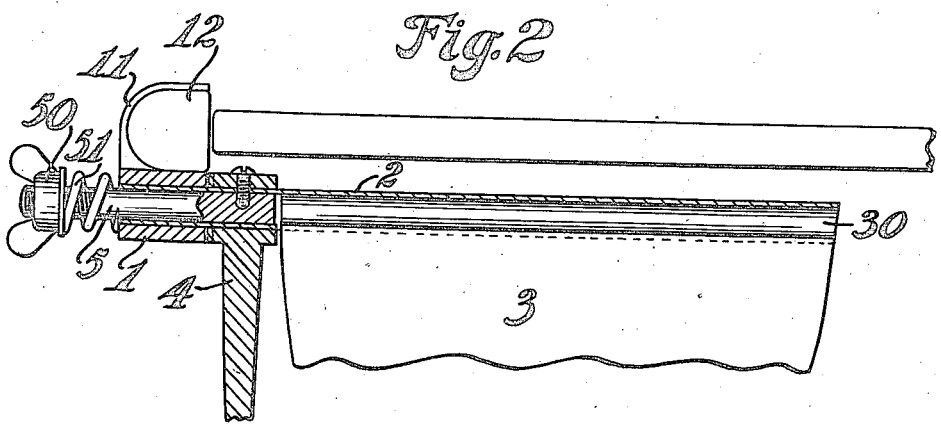
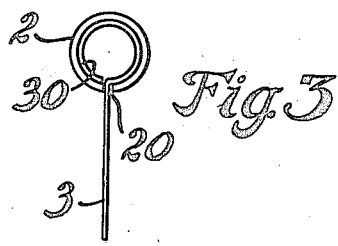
Inventor
Charles H. Lippy
By H. L. & C. L. Reynolds
Attorneys Patented June 5, 1923.

1,457,929

UNITED STATES PATENT OFFICE.

CHARLES H. LIPPY, OF SNOHOMISH COUNTY, WASHINGTON.

GLARE SHIELD.

Application filed January 25, 1922. Serial No. 531,652.

*To all whom it may concern:*

Be it known that I, CHARLES H. LIPPY, a citizen of the United States of America, and resident of Snohomish County, State of Washington, have invented certain new and useful Improvements in Glare Shields, of which the following is a specification.

My invention relates to glare shields or devices designed for attachment to an automobile to shield the eyes of the driver from the glare of a light ahead.

The object of my invention is to provide a screening for the above purpose which is so shaped and mounted that it will enable the driver to shield his eyes from the glare of an approaching headlight and which may be conveniently adjusted by the driver to accommodate it to various conditions.

Further objects of my invention may be ascertained by a study of the specification and the drawings.

The features of my invention which I believe to be new and upon which I desire to obtain a patent will be hereinafter particularly defined by the claims.

In the accompanying drawings I have shown my invention in the form of construction which is now preferred by me.

Figure 1 shows a portion of the windshield of an automobile having my invention mounted thereon, the point of view being that of the driver as he sits in the car.

Figure 2 is a top or plan view of the device on a larger scale, the pivoted edge being in section and the shield plate shown as swung upward into horizontal position or the position of non-use.

Figure 3 is an end view of the plate supporting arm and the plate showing the relations between the two.

My device is shown as mounted upon a base plate or bracket 1 which is secured in any convenient way upon the windshield frame or such other support as may be found suitable. It is shown as having arms 11 which embrace the vertical bar 12 of the windshield frame and a set bolt 10 by which it is secured in position. Any other equivalent supporting means may be employed.

Journaled in this bracket is a bar 2 which supports the shield plate 3. This bar in the construction shown consists of a tube which in the major part thereof, or that occupied by the glare shield, is slotted along one side, as indicated at 20 in Figure 3. To this arm is secured an operating arm 4. This serves as a thrust bearing for the rod. Secured in this end of the tube 2 is a rod 5 which projects from the opposite sides of the bracket and is threaded, having a thumb nut 50 screwing thereon. Between this thumb nut and the end of the bracket 1 is provided some suitable frictional device as serrations 52 so that the rod 2 will remain in whatever angular position it may be placed. As indicated, a spring 51 is employed for this purpose. The spring pressure thus produced will permit easy turning of the tube 2 and at the same time the serrations will hold it in adjusted position.

The glare shield or screen plate 3 is made with tapered sides. Both sides of this are inclined towards each other as they extend downwardly. While these two sides may be made straight edges, I prefer to have them convexly curved, as has been clearly indicated in Figure 1. At the lower end this plate is rounded over, making the outline of the plate resemble that of a semi-ellipse, of which the major axis is vertical.

The purpose of the shape given this plate is to make it broad enough so that it will serve as a shield for both eyes of the driver against the glare of a light ahead and will also shield him from the reflected rays of sun upon a wet pavement. It has been found by experiment that such rays of light are best shielded by a plate which has its sides inclined towards each other with the point of the apex downward.

The upper edge of the plate which is secured to the tube 2 is given a rounded bead, as 30, of such size as to fit snugly within the tube 2. This bead should preferably be made of such size that when inserted in the tube it will tend to expand outwardly against the side of the tube just enough to furnish sufficient friction to hold it securely in adjusted position. It is thus held securely for turning with the tube, its main body extending through the slot 20 and also it is held in adjusted position lengthwise of the tube. Being supported by friction in the tube, it is an easy matter for the operator of the car to pull the plate outward or push it inward so as to adjust its transverse position with relation to the windshield. Such adjustment is indicated by the dotted lines at 31 in Figure 1.

When the use of the shield plate is not desired it may be turned upward into horizontal position. This may be done by engagement with the arm 4. By turning it part way upward the curve produced by the outer margin of the plate as it appears to the eye may be changed. Such change in apparent curvature is indicated by the dotted lines in Figure 1, which illustrate the position of the plate when it has been turned to approximately a horizontal position. In this way the position of the plate may be adjusted to suit the needs or desires of the driver.

The plate 3 may be made of opaque material or of translucent material and be colored as desired. Being easily removable it may be replaced by another plate of a different material and character, thus making it possible for the driver to make it suit his particular desires.

What I claim as my invention is:

1. A glare shield comprising a tubular pivot bar slotted on one side and means to secure it to extend horizontally along the face of the windshield, a semi-transparent plate having a rolled edge adapted to slide into said tube and project through said slot, said rolled edge resiliently engaging the inner surface of said tube to yieldingly hold it against accidental sliding therein and to permit lengthwise adjustment, and means for holding said pivot bar and plate in adjusted angular position.

2. A glare shield comprising a tubular pivot bar having a slot extending lengthwise thereof, means for supporting said pivot bar to extend horizontally adjacent to the windshield face and to turn about its axis, and a semi-transparent plate having a semi-elliptical outline with the straight edge conforming substantially with the minor axis, said straight edge having a tubular roll formed thereon and adapted to be slid into the slotted tube which forms the pivot bar, whereby it may be adjusted in position laterally of the car.

Signed at Seattle, King County, Washington, this 20th day of January, 1922.

CHARLES H. LIPPY.